(12) United States Patent
Crandall-Seibert et al.

(10) Patent No.: US 9,517,835 B2
(45) Date of Patent: Dec. 13, 2016

(54) DEVICE FOR PREVENTING ROTATIONAL MOVEMENT OF FAILED SELECTOR LEVER

(71) Applicant: Hamilton Sundstrand Corporation, Windsor Locks, CT (US)

(72) Inventors: Cory M. Crandall-Seibert, Roscoe, IL (US); Andrew N. Baines, Rockton, IL (US); Timothy Michael Mayer, Belvidere, IL (US); Gary L. Voss, Bryon, IL (US); Sean Bradshaw, Rockford, IL (US); Roger F. Glenn, South Beloit, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 73 days.

(21) Appl. No.: 14/494,988

(22) Filed: Sep. 24, 2014

(65) Prior Publication Data
US 2016/0083078 A1 Mar. 24, 2016

(51) Int. Cl.
| | | |
|---|---|---|
| G05G 5/06 | (2006.01) | |
| G05G 1/04 | (2006.01) | |
| B64C 13/04 | (2006.01) | |
| B64C 13/10 | (2006.01) | |

(52) U.S. Cl.
CPC .............. *B64C 13/10* (2013.01); *B64C 13/04* (2013.01); *G05G 1/04* (2013.01); *G05G 5/06* (2013.01)

(58) Field of Classification Search
CPC .......... B64C 13/04; B64C 13/10; B64C 13/14; G05G 5/06; G05G 5/08; G05G 5/28; G05G 2700/06; G05G 2700/08; G05G 1/04; F16H 61/22; F16H 2059/0282; Y10T 74/20636

See application file for complete search history.

(56) References Cited

U.S. PATENT DOCUMENTS

| | | | |
|---|---|---|---|
| 6,332,524 B1 * | 12/2001 | Shin ........................ | F16H 59/10 192/220 |
| 2014/0116194 A1 | 5/2014 | Nieman | |
| 2014/0157943 A1 * | 6/2014 | John ........................ | G05G 5/06 74/526 |
| 2015/0266564 A1 * | 9/2015 | Iliescu .................... | B64C 13/10 74/523 |

FOREIGN PATENT DOCUMENTS

WO 2014084809 A1 6/2014

OTHER PUBLICATIONS

EP International Search Report, International Application No. 15186749.6-1754, Date of Mailing Feb. 22, 2016, EP Patent Office; International Search Report 8 pages.

* cited by examiner

*Primary Examiner* — Adam D Rogers
(74) *Attorney, Agent, or Firm* — Cantor Colburn LLP

(57) ABSTRACT

A selector lever with two detent plates and corresponding detent pins that travel along a shaft includes a float that moves with each of the detent pins. When a detent pin fails, a float pin remains engaged with a catch, thereby preventing rotational movement of the shaft.

12 Claims, 10 Drawing Sheets

DEVICE FOR PREVENTING ROTATIONAL MOVEMENT OF FAILED SELECTOR LEVER

BACKGROUND OF THE INVENTION

The present disclosure relates generally to selector levers and, more particularly, to a failure detection mechanism for selector levers that may be found, for example, in the cockpit of an aircraft.

Conventional aircraft are commonly equipped with a selector lever for manually controlling the actuation of flaps, ailerons, or other moveable features of the aircraft. The selector lever is mounted in the cockpit for the pilot to select the desired equipment configuration by moving the lever to a position corresponding to the desired equipment configuration. The conventional selector lever is typically constructed with a shaft rotatably arranged adjacent one or two detent plates. One or two detent pins corresponding to the detent plates are movably arranged on the shaft. This configuration provides a measure of redundancy that allows the selector lever to be functional after one detent pin has failed. The ability to detect the failure of one or both detent pins would reduce maintenance costs and improve aircraft safety. Accordingly, the industry is receptive to new developments that provide the capability to detect the failure of a detent pin.

SUMMARY OF THE INVENTION

Disclosed herein is a selector lever that has a shaft with a proximal end rotatably attached to a pivot. The pivot is disposed in a housing with a distal end of the shaft extending from the housing. A slide is movably arranged on the shaft with first and second detent pins operatively connected to the slide. The first and second detent pins are arranged to engage, respectively, a first plurality of slots in a first detent plate and a second plurality of slots in a second detent plate. The selector lever further includes a first float arranged to move with the first detent pin. The first float includes one or more first float pins arranged to be received by one or more first catches.

Another aspect of the disclosure provides a selector lever as part of an aircraft actuator system. The selector lever includes a shaft with a proximal end rotatably attached to a pivot. The pivot is disposed in a housing with a distal end of the shaft extending from the housing. A slide is movably arranged on the shaft with first and second detent pins operatively connected to the slide. The first and second detent pins are arranged to engage, respectively, a first plurality of slots in a first detent plate and a second plurality of slots in a second detent plate. The selector lever further includes a first float arranged to move with the first detent pin. The first float includes one or more first float pins arranged to be received by one or more first catches. A second float is also arranged to move with the second detent pin, the second float including one or more second float pins arranged to be received by one or more second catches.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to a selector lever for aircraft, whereas the advantages of the present disclosure as applied in a related field would be apparent to one having ordinary skill in the art and are considered to be within the scope of the present invention.

Figure 1:
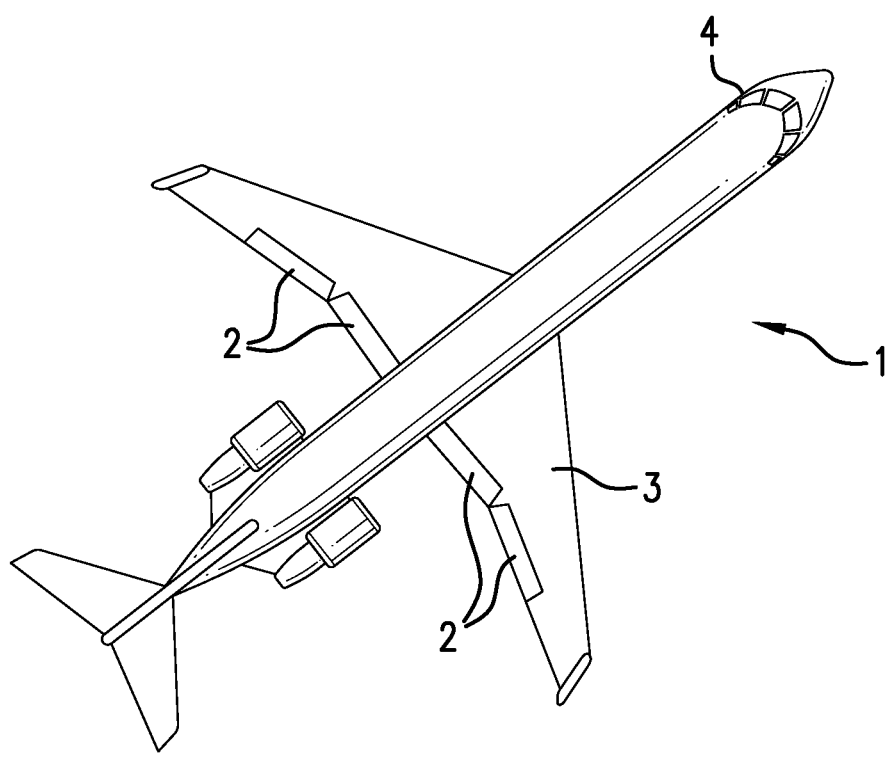
FIG. 1 is an illustration of an aircraft according to one embodiment.

FIG. 1 shows a top view of an aircraft 1 having an aircraft actuator system that employs the selector lever of the present disclosure. For example, the selector lever of the aircraft actuator system may be used to control the position of a plurality of flaps 2 located on the wings 3 of the aircraft 1. The selector lever enables the operator (or pilot) to accurately control the position of the flaps 2 from the cockpit 4. As noted above, the selector lever is contemplated to control the position of various control surfaces, such as the flaps of an aircraft. Specifically, the selector lever is contemplated to be employed in connection with one or more of the high lift surfaces associated with an aircraft. The selector lever may find other uses, in differing environments, without departing from the scope of the present disclosure.

Figure 2A:
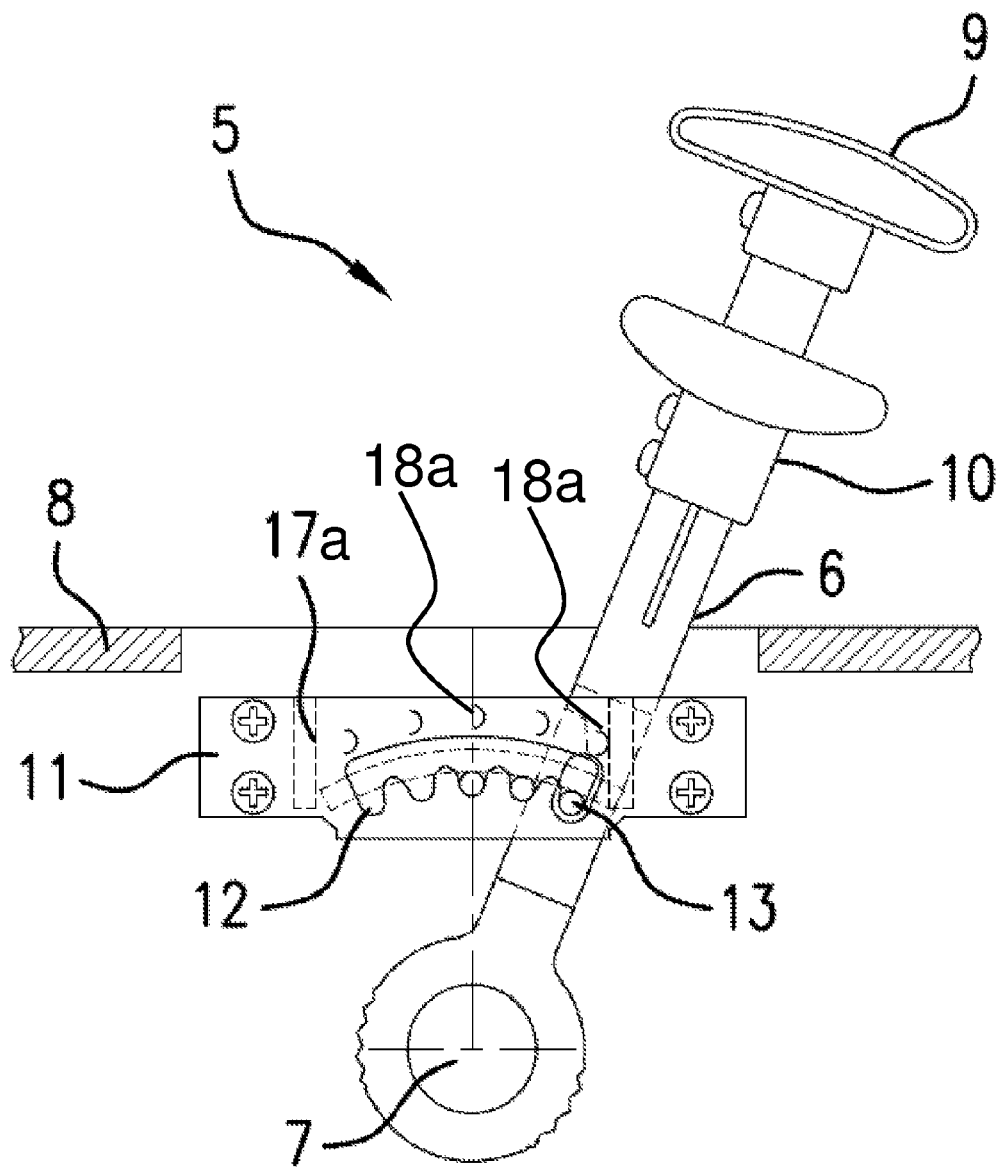
FIG. 2A is a sectioned side view of a selector lever according to one embodiment.

FIG. 2A is a sectioned side view of a hand-operated selector lever 5 according to one embodiment of the present disclosure. The selector lever 5 includes a shaft 6 having a proximal end that is rotatably attached to a pivot 7 that is disposed in a housing 8. The shaft 6 also comprises a distal end 9 that extends from the housing 8. A slide 10 is arranged to move along the shaft 6, the slide 10 at least partially extending from the housing 8. FIG. 2A shows a first detent plate 11 with a plurality of slots 12 disposed in the housing 8 parallel to the path of the pivoting shaft 6. FIG. 2A further shows a first detent pin 13 arranged on the shaft 6 to engage the first plurality of slots 12 of the first detent plate 11. The first detent pin 13 is operatively connected to the slide 10 such that translational movement of the slide 10 along the shaft results in movement of the first detent pin 13.

Figure 2B:
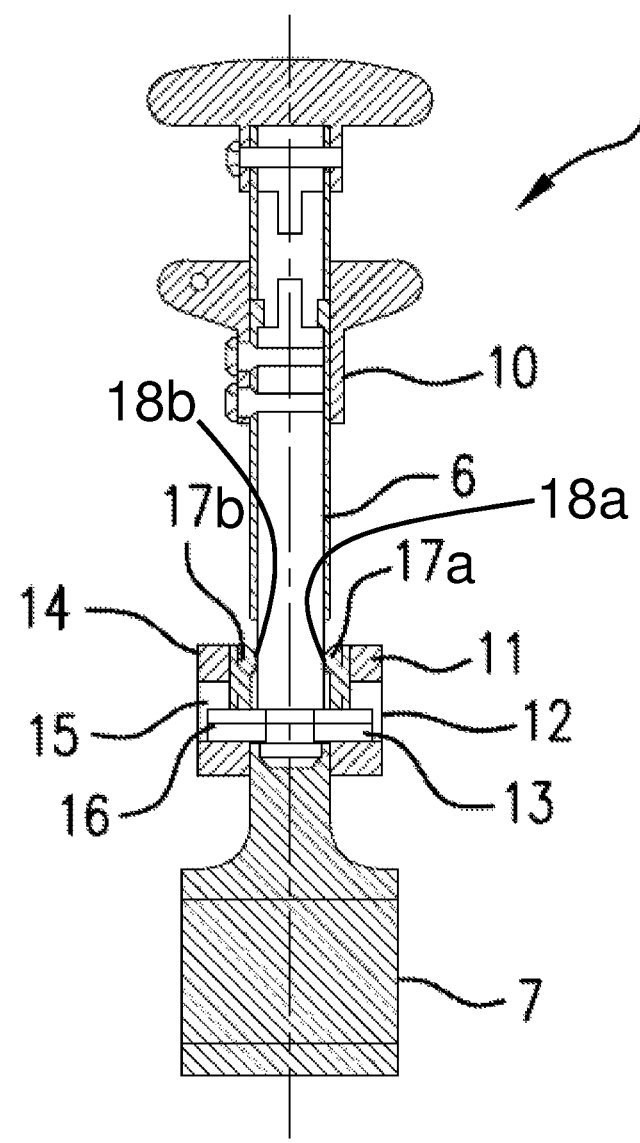
FIG. 2B is a sectioned front view of the selector lever shown in FIG. 2A.

FIG. 2B shows front view (from the left of the selector lever in FIG. 2A) of the selector lever 5. As seen in FIG. 2B, the selector lever comprises a second detent plate 14 having a second plurality of slots 15, arranged opposite from the first detent plate 11. Further, a second detent pin 16 is arranged on the shaft 6 to engage the second plurality of slots 15 of the second detent plate 14, the second detent pin 16 being operatively connected to the slide 10.

The selector lever 5 also includes a first float 17a, arranged to move with the first detent pin 13 in at least one direction, e.g., vertically. As shown in FIG. 2B, a first float 17a is arranged to rest upon the first detent pin 13. As discussed further below, the upward motion of the slide 10 moves the first detent pin 13 upwards, which, when the first detent pin 13 is intact, will in turn lift the first float 17a. Also shown in FIG. 2B, the selector lever 5 similarly comprises a second float 17b that is arranged to move in a vertical direction with the second detent pin 16. The floats 17a, 17b are arranged to move with the respective detent pins 13, 16. In the embodiment illustrated in FIGS. 2A-2C, the floats 17a, 17b are arranged to move in a vertical direction and are prevented from moving in a horizontal direction. For example, the floats 17a, 17b may be prevented from travelling in a horizontal direction by a shoulder in the respective detent plate 11, 14 or another feature embedded within the housing 8.

Figure 2C:
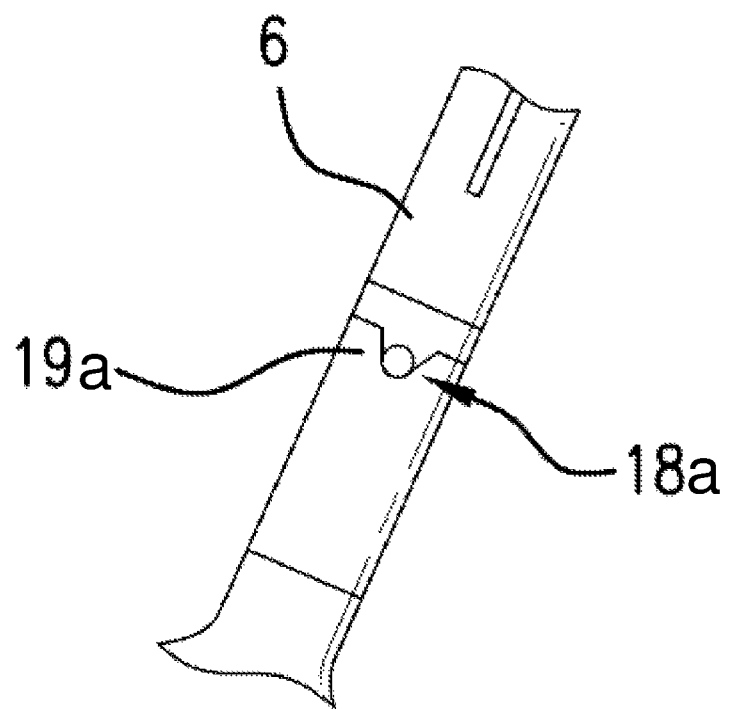
FIG. 2C is a partial view of the selector lever shown in FIG. 2A.

Each float 17a, 17b further comprises one or more respective float pins 18a, 18b arranged to engage a respective catch 19a, 19b. See FIG. 2C, illustrating a first side of the selector lever 5 and a first float pin 18a engaging a first catch 19a. In the embodiment illustrated in FIGS. 2A-2C, one catch 19a, 19b is arranged on each side of the shaft 6 of the selector lever 5 in order to engage the respective float pins 18a, 18b when the shaft 6 is in a particular position. Those of skill in the art will appreciate that FIG. 2A is side view of the selector level 5, as described above, and that FIG. 2B is a front view thereof. Further, in view of the above description, those of skill in the art will appreciate that the right and left sides/views are mirror images of each other, with each side having mirrored features (e.g., a float on each side (17a, 17b), a detent pin on each side (13, 16), slots (12, 15), etc.). Accordingly, the first and second detent plates 11, 14 and other aspects of the selector lever 5 have similar structure and features such that the selector level can operate as described herein.

Figure 3A:
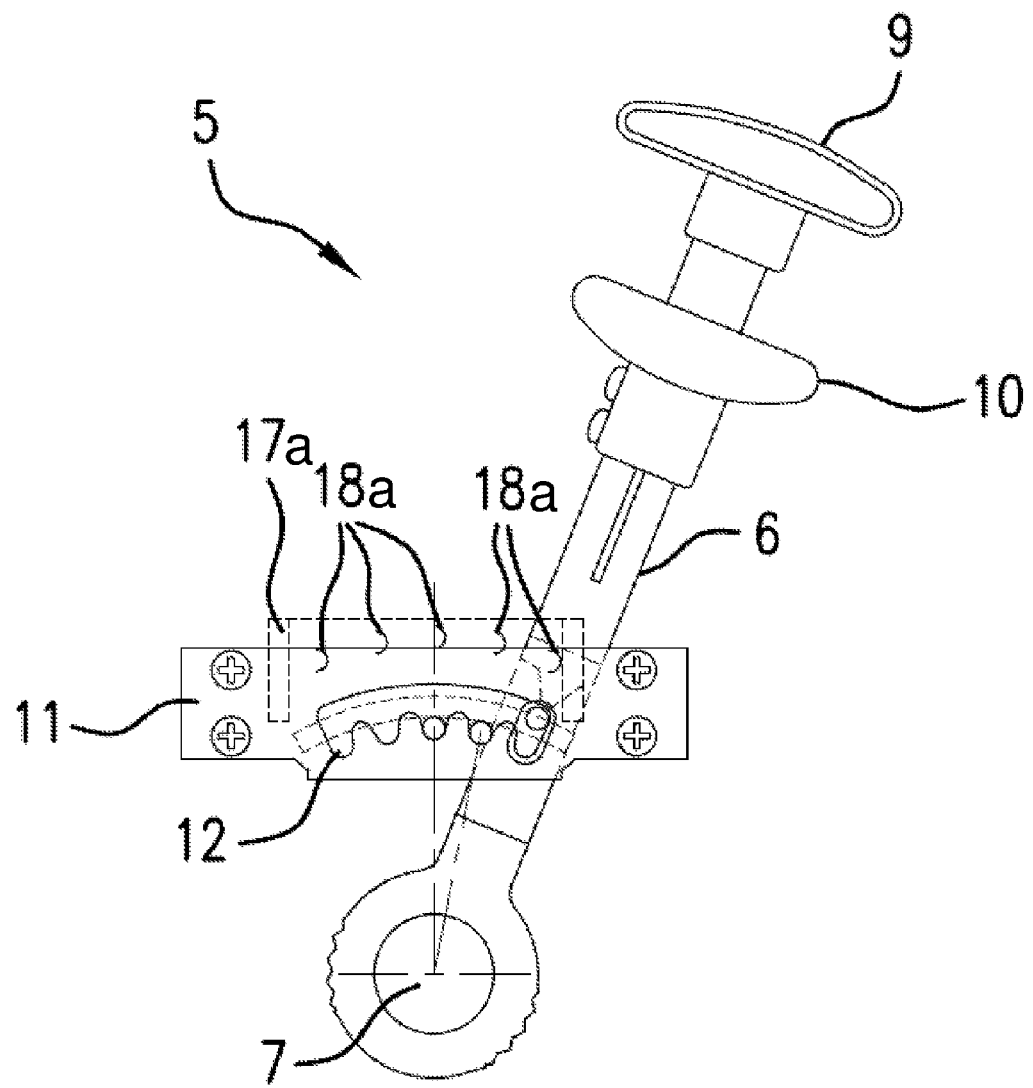
FIGS. 3A-3C are sectioned side, sectioned front, and partial views of the selector lever shown in FIG. 2A in another position.
Figure 3B:
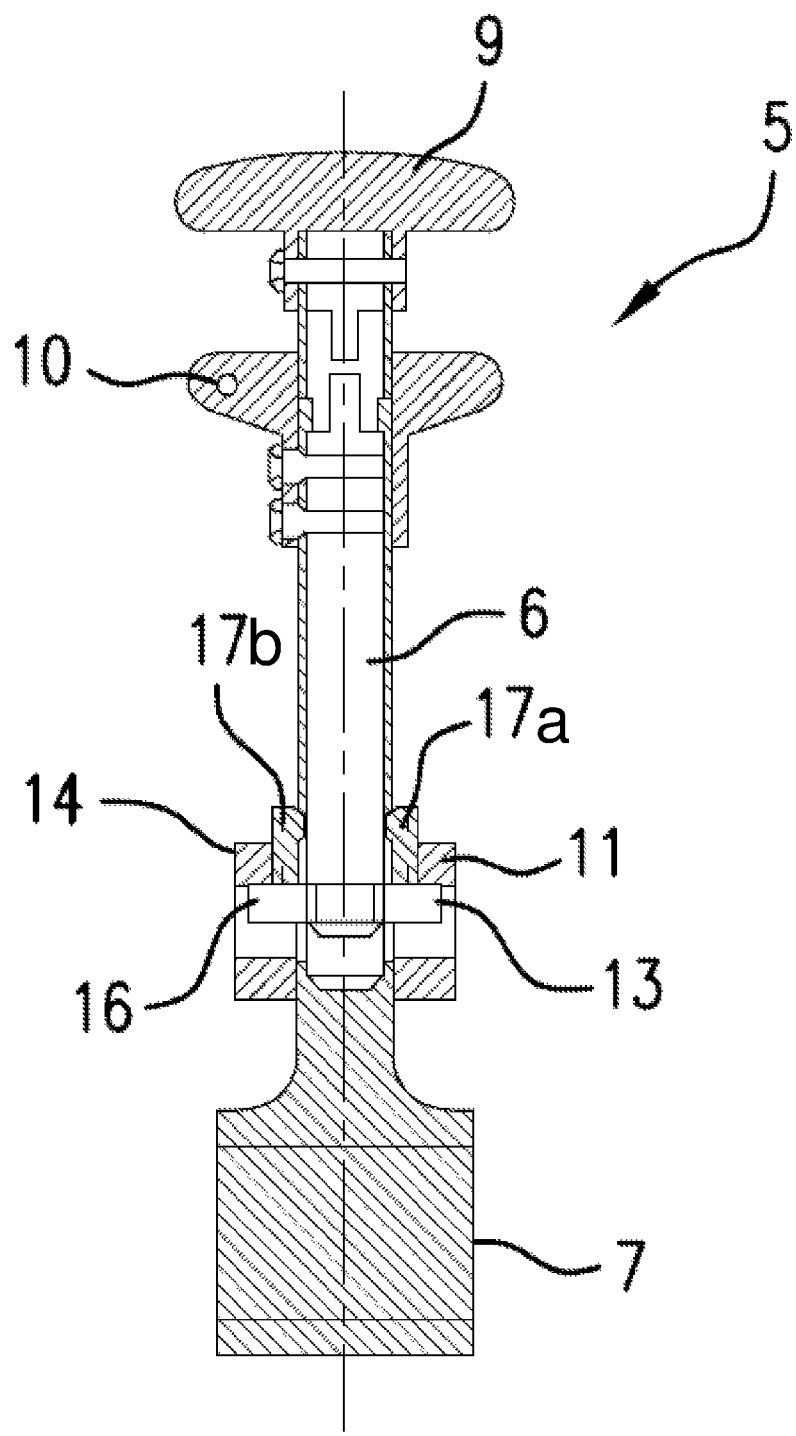
Figure 3C:
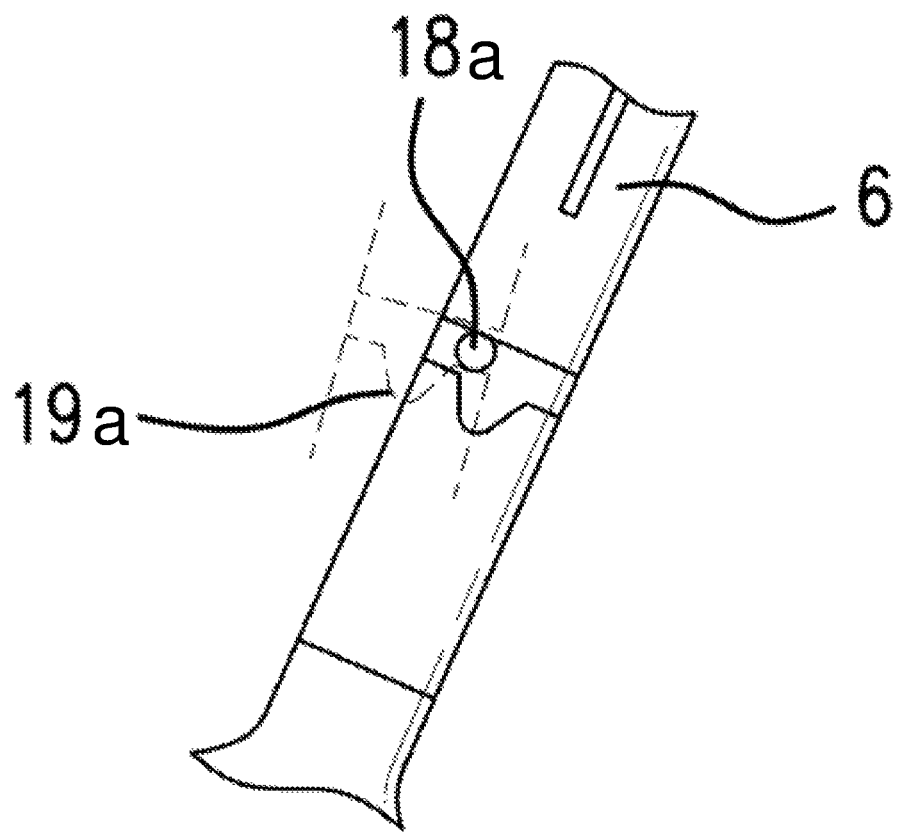

FIGS. 3A and 3B show the embodiment of FIGS. 2A-2C wherein the slide 10 has been moved to disengage the first and second detent pins 13, 16 from the respective slots 12, 15 in the respective detent plate 11, 14, and where both of the first and second detent pins 13, 16 are intact. In this case, the first and second detent pins 13, 16 also move the both of the floats 17a, 17b, which disengages the float pins 18a, 18b from the respective catch 19a, 19b (see FIG. 3C). Thus, when both of the first and second detent pins 13, 16 are intact, the shaft 6 is able to rotate to another position.

Figure 4A:
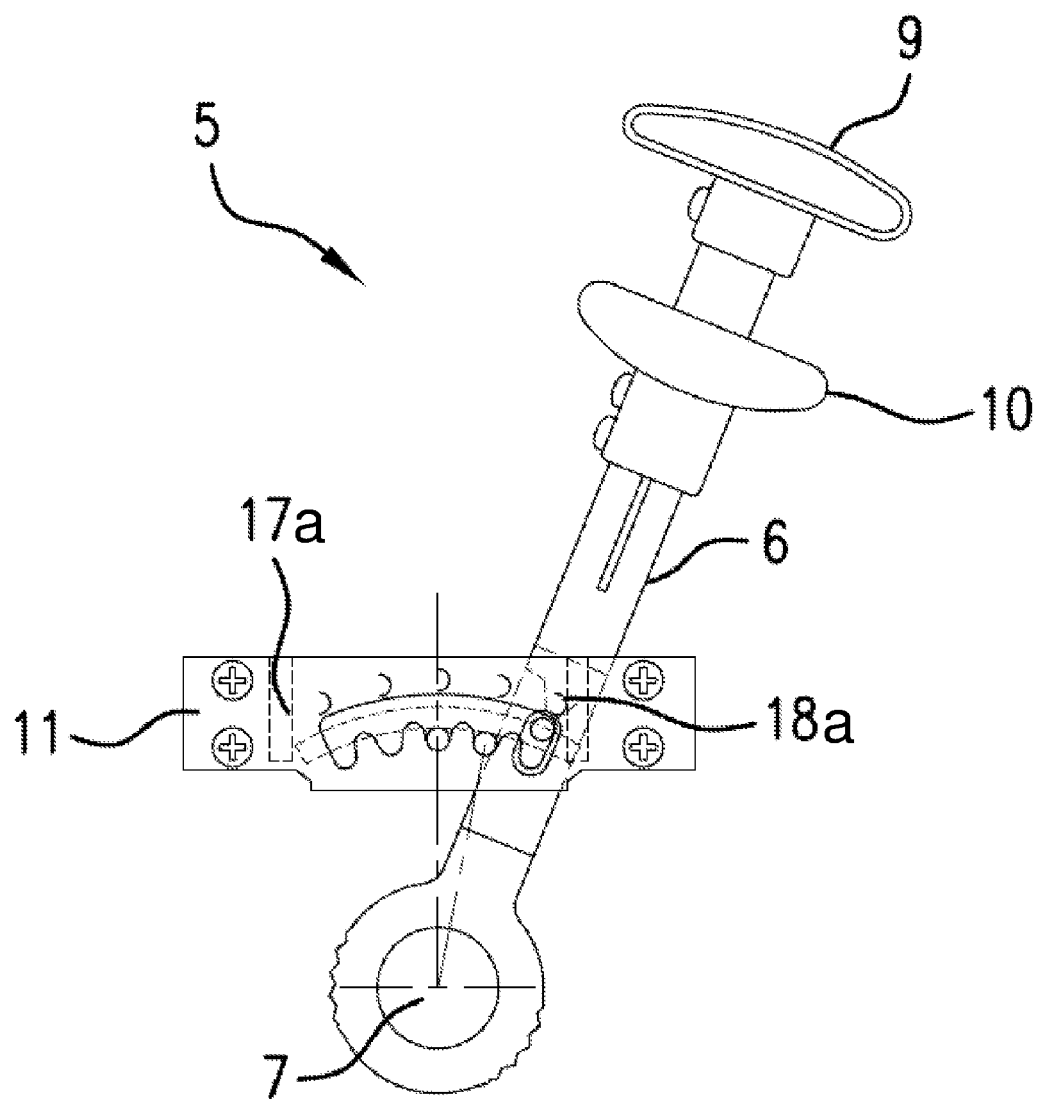
FIGS. 4A and 4B are sectioned side and front views of the selector lever shown in FIG. 2A in another position.
Figure 4B:
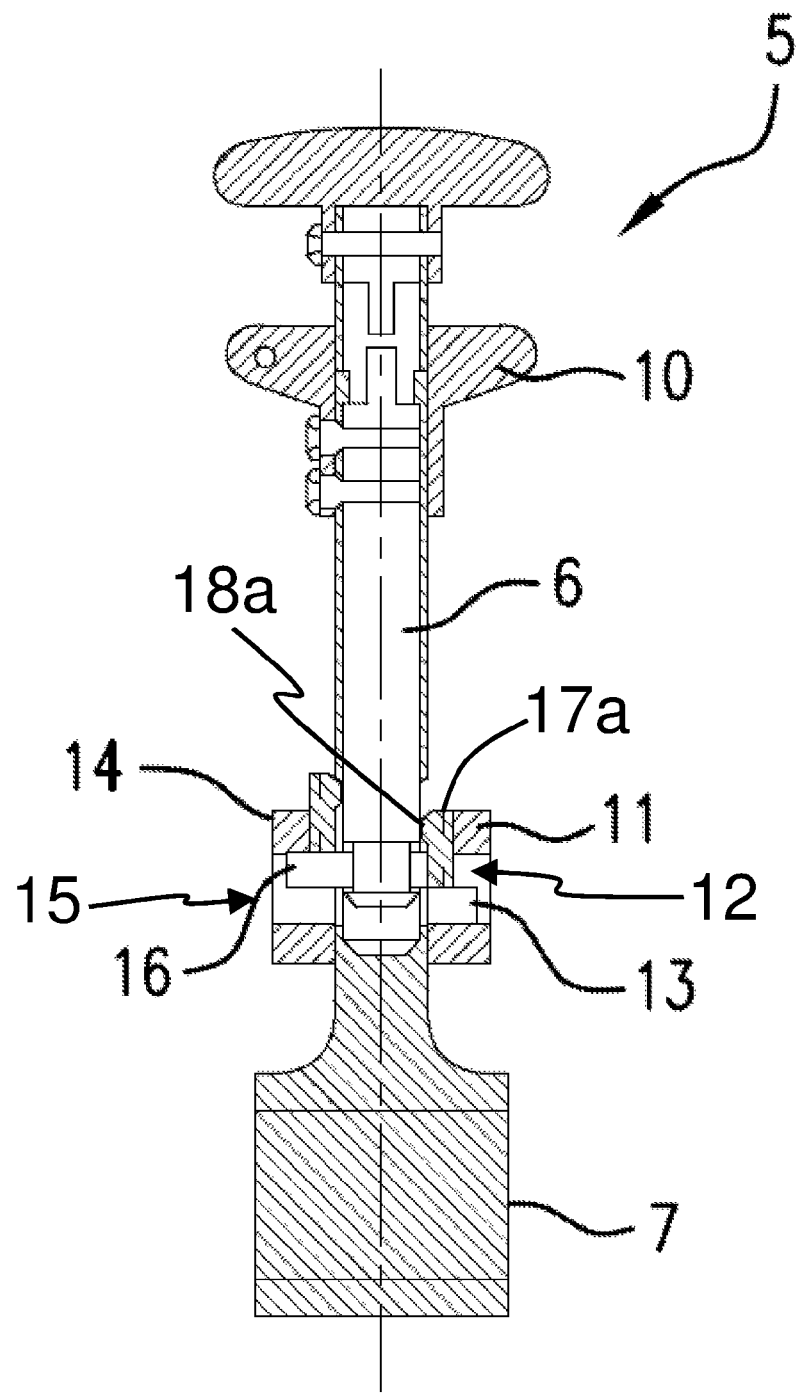

FIGS. 4A and 4B show the embodiment of FIGS. 2A-2C wherein the slide 10 has been moved to disengage the first and second detent pins 13, 16 from the respective slots 12, 15 in the respective detent plate 11, 14, but where the first detent pin 13 has failed. Because the motion of the respective first float 17a depends upon the integrity of the respective detent pin 13, 16, the first float 17a arranged to travel with the first detent pin 13 remains in an engaged position (where the corresponding first float pin 18a remains engaged with the corresponding first catch 19a, as shown in FIG. 2C). With the first float 17a engaged, the shaft 6 is prevented from rotating about the pivot 7.

Because the floats 17a, 17b of the embodiment shown in FIGS. 1A-4B are prevented from moving horizontally, the interaction between the first float pin 17a and the first catch 19a, when engaged, prevents the rotational movement of the shaft 6. Accordingly, when either of the first or second detent pins 13, 16 fails, the respective float 17a, 17b will remain engaged, preventing rotational movement of the shaft 6. Thus, when the slide 10 has been moved into a position that would normally disengage the detent pins 13, 16 from the respective detent plate 11, 14, an inability to move the shaft 6 of the selector lever 5 provides a positive indication to the operator that one or more of the detent pins 13, 16 has failed.

In some examples, the selector lever 5 further includes a release mechanism for disengaging the floats 17a, 17b where one of the detent pins 13, 16 has failed. Without a release mechanism, the selector lever 5 described above may be used in situations where the inability to move the shaft 6 from a particular position is acceptable. In some examples, the floats 17a, 17b of the selector lever 5 described above may include one or more respective float pins 18a, 18b, arranged only at positions where the inability to move the shaft is acceptable. For example, in a selector lever 5 where the detent plates 11, 14 provide a plurality of slots corresponding to different positions of the shaft 6, the floats 17a, 17b may include a number of float pins 18a, 18b that is less than the number of slots, with the float pins 18a, 18b arranged at locations corresponding to positions where the shaft 6 may acceptably remain for a prolonged period, or at least until maintenance can be performed.

Figure 5:
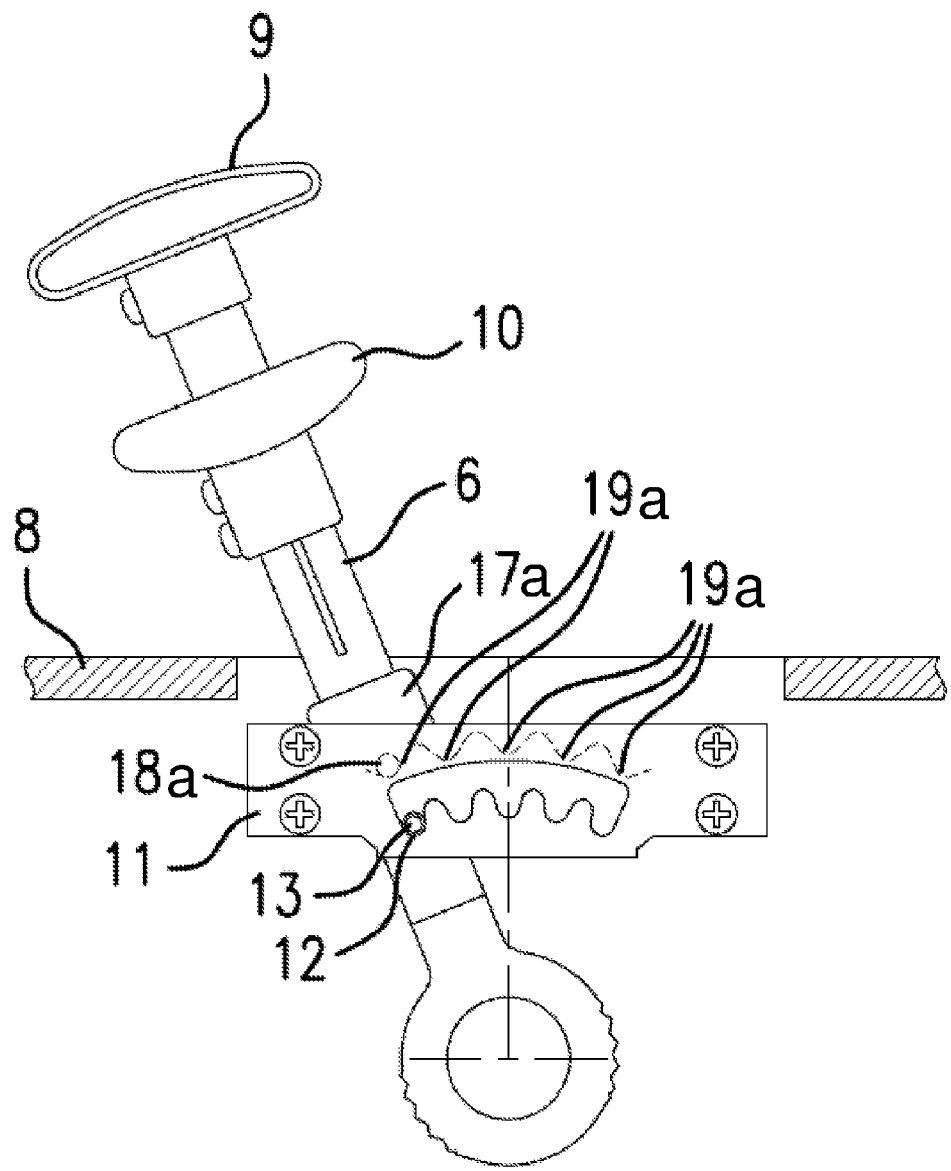
FIG. 5 is a sectioned side view of a selector lever according to another embodiment.

As those in the art will ascertain, the features described above are merely exemplary and may be provided in many forms to achieve some or all of the advantages herein. For example, FIG. 5 illustrates a sectioned side view of the selector lever 5 according to another example of the present disclosure, in which the floats 17a, 17b (with second floats 17b not shown in FIG. 5 due to being a side illustration) are arranged to glide along the shaft 6. Similar to the embodiment described above, the floats 17a, 17b are arranged to travel along the shaft 6 with the motion of the respective detent pin 13, 16 when the detent pin 13, 16 is intact. Each of the floats 17a, 17b includes one float pin 18a, 18b. A plurality of catches 19a, 19b are arranged on or adjacent to the detent plates 11, 14 at positions corresponding to the positions of the shaft 6 when the detent pins 13, 16 are engaged with the respective detent plate 11, 14. The floats 17a, 17b are arranged on the shaft 6 such that the shaft 6 will be prevented from rotating when one of the float pins 18a, 18b is engaged with one of the plurality of catches 19a, 19b. As will be apparent to those in the art, the embodiment shown in FIG. 5 is operated in the same manner as the embodiment shown in FIGS. 1A-4C.

The embodiment shown in FIG. 5 further includes a release mechanism. The release mechanism of FIG. 5 is provided in the form of a pull string connected to the floats that may be used to disengage the float pin 18 from the respective catch 19. In other examples, the release mechanism may be any machine or device, including, for example, a separate tool, which allows the operator to disengage or disable the float after the failure of one or more detent pins has been identified. The release mechanism allows the features of the present disclosure to be utilized in circumstances in which the prolonged inability to move the shaft 6 is undesirable.

In an alternative embodiment, the selector lever may include a biasing element arranged to bias the float against the detent pin. This feature may be useful, for example, where the float is arranged below the detent pin.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A selector lever, comprising:
   a shaft having a proximal end rotatably attached to a pivot, the pivot being disposed within a housing, the shaft having a distal end extending from the housing;
   a slide arranged to be movable along the shaft;
   a first detent pin operatively connected to the slide;
   a second detent pin operatively connected to the slide;
   a first detent plate disposed in the housing and having a first plurality of slots for receiving the first detent pin;
   a second detent plate disposed in the housing and having a second plurality of slots for receiving the second detent pin;
   a first float arranged to rest upon and move with the first detent pin, the first float having one or more first float pins; and
   one or more first catches arranged to receive one of the one or more first float pins.

2. The selector lever of claim 1, further comprising a second float arranged to rest upon and move with the second detent pin, the second float having one or more second float pins; and one or more second catches arranged to receive one of the one or more second float pins.

3. The selector lever of claim 2, wherein the one or more first catches are arranged to receive one of the one or more first float pins when the first detent pin is received by one of the first plurality of slots, and wherein the one or more second catches are arranged to receive one of the one or more second float pins when the second detent pin is received by one of the second plurality of slots.

4. The selector lever of claim 2, wherein the one or more first catches and the one or more second catches are arranged on the shaft.

5. The selector lever of claim 2, wherein the first and second floats are arranged to move in a first direction and are prevented from moving in a second direction, the second direction being perpendicular to the first direction.

6. The selector lever of claim 1, wherein the one or more first catches are arranged to receive one of the one or more first float pins when the first detent pin is received by one of the first plurality of slots.

7. The selector lever of claim 1, wherein the one or more first catches are arranged on the shaft.

8. The selector lever of claim 1, wherein the first float is arranged to move in a first direction and is prevented from moving in a second direction, the second direction being perpendicular to the first direction.

9. The selector lever of claim 1, wherein each of the one or more first float pins corresponds to a position of the shaft when the first detent pin is received by one of the first plurality of slots.

10. The selector lever of claim 1, wherein the first float is arranged to move along the shaft.

11. An aircraft actuator system including the selector level of claim 1.

12. The aircraft actuator system of claim 11, further comprising a second float arranged to move with the second detent pin, the second float having one or more second float pins; and one or more second catches arranged to receive one of the one or more second float pins.

* * * * *